United States Patent
Schwarz

[15] 3,644,139
[45] Feb. 22, 1972

[54] OPAQUE POLYMER FILM AND METHOD OF PRODUCING

[72] Inventor: Eckhard C. A. Schwarz, Neenah, Wis.
[73] Assignee: Kimberly-Clark Corporation, Neenah, Wis.
[22] Filed: Dec. 31, 1969
[21] Appl. No.: 889,530

[52] U.S. Cl. ..........................117/118, 117/36.7, 117/42, 117/62.1, 117/155 R, 161/5, 161/159, 161/160
[51] Int. Cl. ..........................................B44d 5/12
[58] Field of Search ............117/118, 42, 62.1, 155 R, 36.7; 264/49, 340, 41; 260/2.5 N; 161/5, 159, 160

[56] References Cited

UNITED STATES PATENTS 3,108,009  10/1963  Clancy et al. ..........................264/41
2,846,727  8/1958  Bechtold ..................................264/49

Primary Examiner—Ralph S. Kendall
Assistant Examiner—Janyce A. Bell
Attorney—Daniel J. Hanlon, Jr. and Raymond J. Miller

[57] ABSTRACT

An opaque microporous thermoplastic film useful as paper including printing paper. The film contains dispersed throughout it microscopic voids. The voids are apparently created by the shrinking of globules of a reaction product of an organic anhydride introduced into the film in the fused or dissolved state of the polymer and then reacted with an agent capable of acylation.

16 Claims, 4 Drawing Figures

OPAQUE POLYMER FILM AND METHOD OF PRODUCING

BACKGROUND OF THE INVENTION

1. Field of the Invention

This invention relates to the production of opaque polymer films useful particularly in printing paper applications but having desirable characteristics for other purposes also.

2. The Invention with Relation to the Prior Art

The preparation of a paper of synthetic materials comparable to paper from natural cellulosic pulp has been the subject of considerable investigation. Known methods for synthetic paper formation include: (1) the extrusion of foamable styrene resins into thin sheets; (2) the formation of staple synthetic fibers or filaments into sheets by generally conventional fiber handling procedures; (3) the casting of synthetic fiber films; and (4) the extrusion of films containing fillers or pigments incorporated into resins. These procedures have not resulted in papers generally suitable as a replacement for wood pulp paper products. Difficulties of the art have included problems in the area of providing adequate physical properties in the synthetic material sheet and in economic aspects of the procedures.

I have found a new, useful and technically feasible approach to the problem of providing a synthetic paper sheet. I accomplish this by incorporating with a film of thermoplastic material a suitable organic carboxylic acid anhydride. These anhydrides are capable of reacting as by an acylation mechanism to produce a component which is itself incompatible with the thermoplastic film to the extent that it will precipitate and form a separate phase within the film. Importantly, this reaction may be carried out in a most simple manner, for example, in many instances by exposure to steam, to, in effect, occasion a hydrolysis or, viewed somewhat differently, an acylation of the hydroxyl (or the water).

The reaction is of the general type of

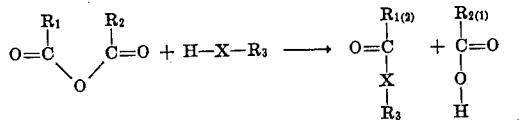

Where: $R_1$ and $R_2$ are aliphatic or aromatic radicals, X is oxygen or nitrogen, which is attached to hydrogen

or an aliphatic radical

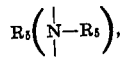

and $R_3$ is an aliphatic radical containing not more than four carbons, or a hydroxyalkyl radical of the type $-(CHR_4)_n-OH$, where $n$ is an integer from 2 to 6, and $R_4$ is an alkyl radical or hydrogen. Generally, the film develops opacity to some degree simply by the occurrence of the precipitate; such opacity development is further enhanced by washing of the film to remove solubles and heating of the film to effect drying. The drying action particularly contributes to opacity in the product film.

While I do not wish to be confined to any particular theory in the expression of my invention, it appears appropriate to offer a possible explanation of the unique opacity changes. I consider that the anhydride is dispersed as submicroscopic globules or homogeneously dissolved in the thermoplastic polymer matrix, and, when reacted with a component to effect acylation of the component, becomes incompatible with the matrix, precipitates into a second phase, and due to the reaction undergoes an expansion in volume as well as change in refractive index. The opacity is thus provided due to light scattering at the distinct interfaces generated by the reaction and by light diffraction by passing through these interfaces. In the subsequent heating, the anhydride reaction product tends to shrink, leaving voids bordering, at least to some extent, the globules, thereby further enhancing the opacity condition. In any event, opacification occurs upon reaction and is intensified by drying or heating in accordance with the principles of my invention.

The thermoplastic resins useful in the base film are many; polystyrene, polyethylene, polypropylene, styrene-acrylonitrile copolymers and the like. Such must blend with the selected anhydride. The latter may also be chosen from a wide variety of materials, polymeric or monomeric. For example, copolymers of maleic anhydride and either styrene or vinyl acetate, or methyl-vinyl ether, or ethylene are useful as are the monomerics—maleic anhydride, phthalic anhydride, pyromellitic anhydride, succinic anhydride and the like. Importantly, such organic anhydrides blend well with the thermoplastics in the fluid state of the resin and are readily extruded to a homogeneous film form. Further, the anhydrides in such thin films as paperlike sheets (0.003 in.) are well exposed for reaction with agents for hydrolysis, ammonolysis, alcoholysis, hydration and the like, or stated somewhat differently, water, ammonia, alcohols and amines may be acylated readily upon contact with the film. The thermoplastic resin is a homopolymer or copolymer present to the extent of 60 to 98 percent by weight, the anhydride being present to the extent of 40 to 2 percent by weight.

The film formation with the anhydride included may itself be accomplished in any suitable manner for the purposes of this invention. I prefer to disperse the thermoplastic resin and the organic anhydride in a common solvent and then to cast the film from solution. Alternatively, the films may be formed from powders of the resin and the anhydride by fusion between press plates as will be noted more particularly hereinafter, or may be formed at the die of an extruder. The mole ratio then for a copolymer of styrene and maleic anhydride is suitably between 2:1 to 4:1.

BRIEF DESCRIPTION OF THE DRAWINGS

The invention will be more fully understood by reference to the following detailed description and accompanying drawings wherein.

PREFERRED EMBODIMENTS OF THE INVENTION

Figure 1:
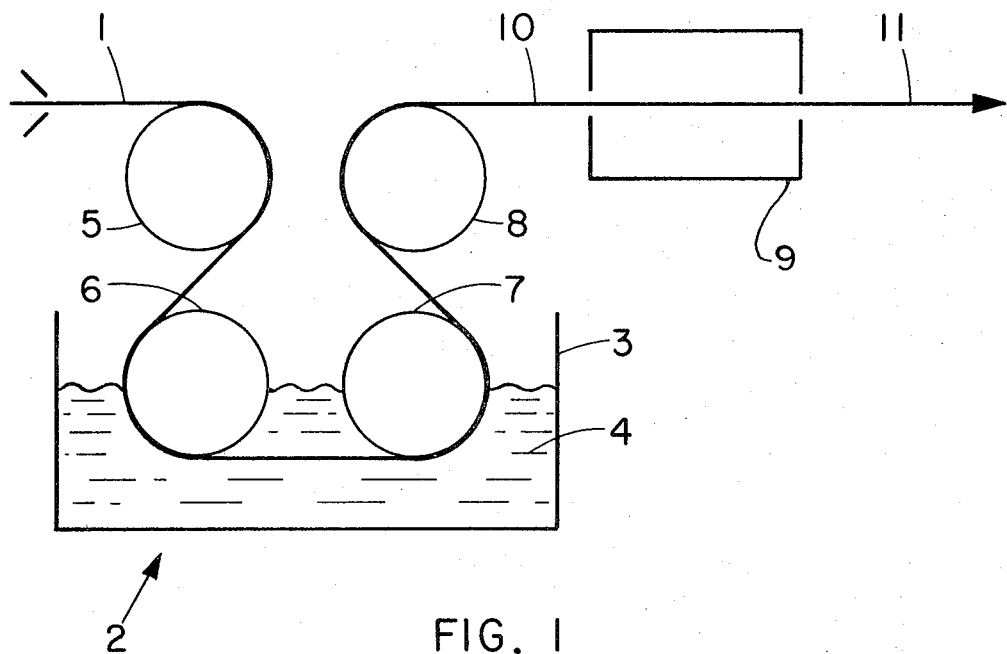
FIG. 1 is a schematic illustration of an apparatus arrangement useful in the practice of a preferred embodiment of the invention.

Referring to the drawing and initially particularly to FIG. 1, the numeral 1 indicates a travelling polymer film containing, in accordance with the invention, an organic anhydride. The film is transparent and the presence of the organic anhydride within the film is not determinable visually. The film is directed to a bath indicated generally at 2 containing an ammonia hydroxide solution, the ammonia being present suitably to the extent of up to about 10 percent by weight. The retaining bath structure is indicated at 3, and the solution is indicated by the numeral 4. The film is presented to the bath over rolls 5 and 6 and exits from the bath over rolls 7 and 8 to an oven 9. The bath, in effect, serves not only to present a reactant to the anhydride of the film but also to wash the film as it emanates from the solution. The oven 9 is suitably operated at a temperature of about 80°–120° C.

Figure 2:
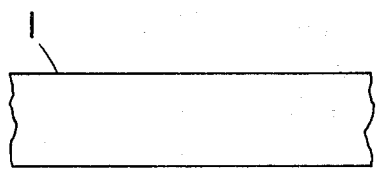
FIG. 2 is a fragmentary view illustrating simply a film structure, the film being suitably formed by a casting or fusion process.
Figure 3:
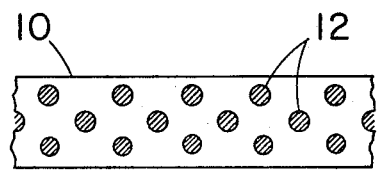
FIG. 3 is a view of the film of FIG. 2 but after treatment with a suitable liquid as illustrated in FIG. 1.
Figure 4:
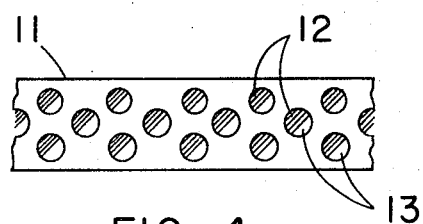
FIG. 4 is illustrative of the condition of the film of FIG. 3 after the film has been subjected to an oven treatment as in FIG. 1.

Referring now to FIG. 2, the clear film is indicated by the numeral 1 which is the film as it is presented to the bath of FIG. 1. As shown in FIG. 2 (see FIG. 1 also) the film as it emanates from the bath has a dispersed phase consisting of an amide which is the reaction product of the anhydride and the ammonia solution of bath 2. As the film emanates from the oven 9, the dispersed amide components have been somewhat swollen, but the loss of water has resulted in the development of voids indicated by the numeral 13 (FIG. 4). As indicated by FIG. 3, the formation of the dispersed amide components 12 is effective to somewhat opacify the film. Further, opacification apparently takes place upon the development of the voids 13.

The following examples will more clearly indicate the scope of the invention.

EXAMPLE 1

One part by weight of polystyrene and 0.2 part by weight of an alternating copolymer of styrene and maleic anhydride were dissolved in acetone (about 10 parts by volume). The solution was then cast upon a smooth glass surface and a film formed by evaporation of the solvent at room temperature. The solid film was transparent. The film was then exposed to saturated steam at a temperature about 100° C. for a time period of about 30 seconds. The film, upon exposure to the steam, developed some opacity in accordance with the already discussed FIG. 3 of the drawings. The film was then washed to remove any solubles and dried at a temperature of about 80° C. The opacity was then determined after drying to be 87 percent; this was based upon Tappi procedure T-425-M-60. The weight of the film thus produced is about 8.3 pounds per 3,000 sq. ft., this providing a very light weight printable sheet. The density of the film during the course of the procedure changed from 0.95 to 0.75 g./cm$^3$.

EXAMPLE 2

Example 1 was repeated except that the transparent solid film formed by casting was exposed to ammonia vapor at a temperature of 60° C. for 60 seconds and the step of submission to steam was eliminated. The treatment with the ammonia was followed by washing and drying as per Example 1. Examination by infrared spectroscopy showed that the anhydride had been converted to amide and carboxylate at a ratio of about 1:1. This was evidenced from the appearance of two separate carbonyl bands at 1,700 cm.$^{-1}$ (—COO$^-$) and 1660 cm.$^{-1}$ (—CONH$_2$) of equal intensity.

The opacity by Tappi procedure T-425-M-60 was about 85.

EXAMPLE 3

Example 1 was repeated except that a solid cast film was exposed to an 0.1 normal aqueous solution of ammonium hydroxide in accordance with FIG. 1 of the drawings, and no steaming step was involved. The film developed opacity due to the treatment with the ammonium hydroxide and further developed opacity upon drying. The opacity was as determined by Tappi procedure T-425-M-60 to be about 87.

EXAMPLE 4

Example 1 was repeated employing one part by weight of polystyrene and 0.2 part by weight of methylvinylether-maleic anhydride alternating copolymer. In accordance with Example 1 the resin and the agent capable of being acylated were dissolved in acetone and cast as a film from the solution. This film, like that of Example 1 in the solidified state, was transparent but, when exposed to saturated steam for about 30 seconds at 100° C., developed significant opacity. When further subjected to washing and drying, the opacity further increased. At a film basis weight of about 11.5 pounds per 3,000 square feet, the percent Tappi opacity was 91.

EXAMPLE 5

Example 2 was repeated utilizing the film containing one part by weight of polystyrene and 0.2 part by weight of methylvinylether-maleic anhydride alternating copolymer. The film, when subjected to ammonia vapor of 60° C. for about 60 seconds and without any washing or drying action, achieved a Tappi opacity of about 91 percent at a film basis weight of about 8.5 pounds per 3,000 square feet.

EXAMPLE 6

Example 4 was repeated but using one part by weight of polystyrene and 0.2 part by weight of vinyl acetate-maleic anhydride alternating copolymer. The product at a film basis weight of about 8–9 pounds per 3,000 square feet exhibited a Tappi opacity of about 87 percent.

EXAMPLE 7

Example 5 was repeated but using 1 part by weight of styrene acrylonitrile copolymer of 3:1 mole ratio and 0.2 part of vinyl acetate-maleic anhydride alternating copolymer at a basis weight of about 9.5 pounds per 3,000 square feet. The film exhibited a Tappi opacity of 89 percent.

EXAMPLE 8

One part by weight of polymethylmethacrylate and 0.2 part by weight of styrene-maleic anhydride alternating copolymer were dissolved in dioxane and a film was cast from the solution. Such film, when treated in accordance with Example 1, developed good opacity.

EXAMPLE 9

Approximately 1 part by weight of polystyrene and 0.2 part by weight of styrene-maleic anhydride alternating copolymer in powder form were thoroughly mixed and a film was pressed from the mixture at 230° C. The pressing involved heating the powder to 230° C. in a closed press at about 20,000 pounds per square inch for 40 seconds. This provided a transparent film which, upon subjection to ammonia vapor, developed significant opacity.

EXAMPLE 10

A thin cellulosic paper sheet of about 19.5 pounds per 3,000 square feet basis weight was coated with an acetone solution of polystyrene and styrene-maleic anhydride alternating copolymer (4:1 weight ratio). After coating both sides and drying the basis weight of the paper was 6 pounds per 3,000 square feet. The dried coated paper was exposed to ammonia vapor for 5 minutes. The effect of coating as opacity developed is indicated by the following data:

| | |
|---|---|
| Opacity | 87% |
| Bursting strength | 23 pounds |
| % Tear (Elmendorff) | 22 |

EXAMPLE 11

A film containing one part by weight of styrene-acrylonitrile copolymer of 3:1 mole ratio and 0.2 part of polyacrylic anhydride was cast from an acetone solution. Such film, when treated in accordance with Example 1, developed good opacity.

EXAMPLE 12

A film containing 1 part by weight of polystyrene and 0.2 part of a monomeric anhydride, that is, phthalic anhydride, was formed by casting from an acetone solution. This film was transparent and was exposed to ammonia vapor at a temperature of about 60° C. for about 1 minute. The anhydride converted to amide and carboxylate as evidenced by separate carbonyl band formation. This resulted in good opacity development.

EXAMPLE 13

Example 3 was repeated except the aqueous solution of ammonium hydroxide contained about 2 percent of 2-aminocthanol (hydroxyalkylamine). The product, upon drying, exhibited an opacity of about 80 percent and additionally, as indicated by the absence of clinging to a metal surface after brushing with a wool cloth, had improved antistatic properties relative to the product of Example 3.

EXAMPLE 14

Example 1 was repeated using varying quantities of the styrene-maleic anhydride copolymer relative to the polystyrene. The quantity of the anhydride copolymer employed, together with the basis weight of the film in pounds per 3,000 square feet and the opacity achieved by Tappi method T-425-M-60 are indicated in the following table.

| Maleic anhydride copolymer | Basis weight of film lb./3,000 sq. ft. | % Tappi opacity |
|---|---|---|
| 0.05 | 7.5 | 75 |
| 0.10 | 11.2 | 81 |
| 0.30 | 9.3 | 90 |
| 0.40 | 12.3 | 91 |

Tappi procedure T-425-M-60 used in opacity measurements may be described essentially as follows: in the measurement of opacity in the data given above a contrast-ratio method, that is, Tappi method T-425-M-60, is based on a principle that the reflectance of paper when combined with a white backing is higher than that of paper when combined with a black backing because, in the former case, light transmitted through the opaque sheet is largely reflected by the white backing, and a portion of the light thus reflected is transmitted through the paper a second time. The contrast ratio is 100 percent for perfectly opaque paper and is only a small percent for a perfectly transparent sheet. As will be noted from the specification and general subject matter given hereinbefore, opaque substrates, in accordance with this invention, have an opacity of at least about 75 percent.

As many apparently widely different embodiments of this invention may be made without departing from the spirit and scope thereof, it is to be understood that I do not limit myself to the specific embodiments thereof except as defined in the appended claims.

1. A method of making an opaque, thermoplastic film which comprises the steps of
    a. providing a film of a thermoplastic resin containing an organic carboxylic acid anhydride, and
    b. contacting the film containing said anhydride with an agent selected from the group consisting of water, steam, alcohol, ammonia, and amines to
        1. cause acylation;
        2. produce a component incompatible with the thermoplastic resin; and
        3. cause component precipitation within the film and film opacification.

2. The method according to claim 1 in which the opacifying of the film is further accomplished by subsequently drying the film.

3. The method according to claim 1 in which acylating composition includes an agent capable of enhancing the antistatic properties of the dry film.

4. The method according to claim 1 in which the acylating composition is a vapor and drying of the film is not necessary.

5. The method according to claim 1 in which the thermoplastic resin film is cast from a solution containing the thermoplastic resin and the anhydride and the resin is a blend of styrene homo- or copolymer and the anhydride a copolymer of styrene and maleic anhydride, the anhydride copolymer being present between 40 and 2 percent by weight.

6. The method according to claim 1 in which the film is formed by fusion under pressure and the resin is a blend of styrene homo- or copolymer and a copolymer of styrene and maleic anhydride in which the mole ratio of styrene and maleic anhydride is between 2:1 and 4:1.

7. the method according to claim 1 in which the film is formed by extrusion through a die and the resin is a blend of styrene homo- or copolymer and a copolymer of styrene and maleic anhydride in which the mole ratio of styrene and maleic anhydride is between 2:1 and 4:1.

8. The method according to claim 3 in which the opacifying of the film by vapor contact is effected while the film is deposited on a substrate whereby the opacity of the composite of substrate and film is increased.

9. The method according to claim 1 in which the acylating agent includes a hydroxyalkylamine.

10. An opaque porous substrate comprising a film of a thermoplastic polymer having dispersed throughout globules of an acylated organic anhydride which is incompatible with the polymer and voids bordering the globules forming light scattering interfaces with the polymer of the film.

11. An opaque porous substrate according to claim 10 in which the film is a paperlike sheet.

12. An opaque porous substrate according to claim 10 in which the acylated organic anhydride is an amide.

13. A substrate having thereon an opaque porous coating comprising, a thermoplastic polymer film having dispersed throughout globules of an acylated organic anhydride which is incompatible with the polymer and voids bordering the globules forming light scattering interfaces with the polymer of the film.

14. An opaque porous substrate according to claim 13 in which the coating is on a cellulosic paper sheet.

15. An opaque porous substrate according to claim 10 in which the opacity as determined by Tappi procedure T-425-M-60 is at least about 75 percent.

16. An opaque porous substrate according to claim 10 in which the substrate is characterized by antistatic properties.

* * * * *

PO-1050
(5/69)

UNITED STATES PATENT OFFICE
CERTIFICATE OF CORRECTION

Patent No. 3,644,139          Dated February 22, 1972

Inventor(s) Eckhard C. A. Schwarz

It is certified that error appears in the above-identified patent and that said Letters Patent are hereby corrected as shown below:

In claim 8, line 1, the claim reference numeral "3" should read as the numeral -- 4 --.

Signed and sealed this 19th day of September 1972.

(SEAL)
Attest:

EDWARD M. FLETCHER, JR.
Attesting Officer

ROBERT GOTTSCHALK
Commissioner of Patents